3,062,798
POLYMERIZATION OF ALLYL AMINES WITH $N_2F_4$
John R. Lovett, Edison, N.J., assignor to Esso Research and Engineering Company, a corporation of Delaware
No Drawing. Filed June 20, 1960, Ser. No. 37,059
6 Claims. (Cl. 260—89.7)

This invention relates to a novel catalyst for polymerizing olefins. More particularly, it relates to an improved process of that nature employing tetrafluorohydrazine as the catalyst.

It has now been found that olefins of the types listed below are polymerized in the presence of tetrafluorohydrazine as a catalyst to hard, solid polymers. This makes available a new polymerization tool for preparing valuable materials. This polymerization is particularly surprising since monomers of the indicated nature, for the most part, do not polymerize readily with conventional free radical catalysts such as benzoyl peroxide.

The tetrafluorohydrazine catalyst corresponds to the formula $N_2F_4$ and has been prepared by the reduction of nitrogen trifluoride ($NF_3$) over copper at high temperatures [1] or by the reaction of ammonia and fluorine.[2] Since this material boils at —66° C. at atmospheric pressure, it is employed in the gas phase in an amount of about 0.01 to 1 mole per mole of olefin monomer.

The monomers catalyzed fall into the categories of:

(a) Allylic compounds with the exception of those containing allylic halogen.
(b) Nitrogen containing olefins.
(c) Aldehydes or ketones conjugated with a double bond.

The monomers employed thus fall into several categories.

Allylic compounds such as allyl alcohol, allylacrylamide, N,N-diallylacrylamide, furfuryl acetate, allylacetate, allyl ethers, such as acrolein diethyl acetal and mono, di and triallylamine, all polymerize readily. Of the many allylic compounds investigated only those containing halogen in the allylic position failed to polymerize to any great extent.

Olefin containing nitrogen compounds polymerized readily. Examples of compounds of this type are pyrroles, allylic amines, and various amides.

Olefins containing carbonyl groups conjugated with the double bond are polymerized readily with this catalyst. Examples of compounds of this type which have been polymerized are furfural, acrolein, methyl vinyl ketone and methyl furyl ketone.

The temperature employed is in the range of about 50° C. to 150° C. The pressure is not critical and can range from atmospheric to pressures of about 400 p.s.i.

Diluents can be employed in the process as desired. Since, however, the catalyst is gaseous, no deashing problems are encountered.

This invention and its advantages will be better understood by reference to the following examples.

EXAMPLE I

*Polymerization of Allylamine*

0.4 g. (0.007 mole) of pure allylamine was charged into a gas phase reactor. After cooling the reactor containing this material to —76° C., the system was carefully evacuated. Tetrafluorohydrazine 146 cc. (at S.T.P.) or 0.00605 mole (.634 gm.) was then charged into the reactor. The reaction mixture was allowed to warm to room temperature and was then heated to 100° C. during a period of 70 minutes. When the temperature in the reactor reached 90° C. a pressure decrease was noted and a brown resinous solid was formed in the reaction flask. Cooling the reactor to room temperature resulted in a pressure reading in the reactor corresponding to that due to the charged $N_2F_4$. An infrared spectrum of the gas indicated it to be pure $N_2F_4$. The conversion of allylamine to polyallylamine was 100%.

EXAMPLE II

By a procedure identical to that described in Example I diallylamine 0.16 g. (0.0017 mole) was reacted with 0.005 mole $N_2F_4$. Again a brown resinous polymer was obtained and no $N_2F_4$ was consumed. The conversion of diallylamine to polydiallylamine was 100%.

EXAMPLE III

By a procedure identical to that described in Example I triallylamine 0.685 g. (0.005 mole) and $N_2F_4$ (122 cc. at 27° C. and 765 mm.) were reacted during 1½ hours. Again polytriallylamine was formed and essentially no $N_2F_4$ was consumed. The conversion to polymer was 100%.

EXAMPLE IV

By a procedure identical to that described in Example I a mixture of furfuryl acetate 0.350 g. (0.0025 mole) and $N_2F_4$ 1.0 g. (0.01 mole) was heated to 150° C. in a glass bulb. Polymerization occurred when the temperature reached about 100° C. The rate of polymerization was not measured but all of the furfurylacetate had polymerized in one hour. No measurable amount of $N_2F_4$ was consumed during the polymerization. The product was a brown solid.

Acrolein and pyrrole were polymerized to solid products in the same manner as in Example IV.

The polymers produced by this invention can be used as soil conditioners and thickening agents.

The advantages of this invention will be apparent to those skilled in the art. A novel polymerization process is made available for polymerizing olefins that normally react with difficulty. The polymerization can be carried out under relatively mild conditions and the catalyst is completely recoverable.

It is to be understood that this inventon is not limited to the specific examples which have been offered merely as illustrations and that modifications may be made without departing from the spirit thereof.

What is claimed is:

1. A process for polymerizing a polymerizable allylic amine compound selected from the group consisting of allylamine, diallylamine, and triallylamine which comprises catalytically polymerizing said compound at temperatures up to about 150° C., in the presence of tetrafluorohydrazine as the catalyst in a catalytic proportion, and separating the resulting polymer from the catalyst.

2. A process for preparing a polymer of a polymerizable allylic amine compound selected from the group consisting of allylamine, diallylamine, and triallylamine which comprises catalytically polymerizing the allylic amine compound under pressure in the range of 1 atmosphere to about 400 p.s.i. at a temperature in the range of about 50° to 150° C. and in the presence of about .01 to 1 mole of tetrafluorohydrazine as catalyst per mole of the allylic amine compound until the polymer is formed, and separating the polymer from the catalyst.

3. The process of claim 2 in which the allylic amine compound is allylamine.

4. The process of claim 2 in which the allylic amine compound is diallylamine.

5. The process of claim 2 in which the allylic amine compound is triallylamine.

6. The process of polymerizing allylamine to polyallylamine which comprises admixing about .01 to 1 mole of gaseous tetrafluorohydrazine per mole of allylamine

[1] Colburn and Kennedy J.A.C.S. 80, 5004, 1958.
[2] Morrow, Perry and Cohen, J.A.C.S. 81, 6338, 1959.

to the allylamine cooled to below room temperature in a reaction zone, warming the resulting mixture of the allylamine and tetrafluorohydrazine to room temperature, then up to about 100° C. under a pressure of atmospheric to about 400 p.s.i. until polymer is formed from the allylamine, then cooling the resulting polymer and the unreacted tetrafluorohydrazine, and recovering the polymer separated from the tetrafluorohydrazine.

References Cited in the file of this patent

UNITED STATES PATENTS

| | | |
|---|---|---|
| 2,349,979 | Moldenhauer | May 30, 1944 |
| 2,926,161 | Butler et al. | Feb. 23, 1960 |

OTHER REFERENCES

Colburn et al.: J.A.C.S. 80, 5004 (1958).